C. A. BLACK, Jr.
PLANT PROTECTOR AND SUPPORT.
APPLICATION FILED OCT. 17, 1911.
1,018,157.
Patented Feb. 20, 1912.
2 SHEETS—SHEET 1.
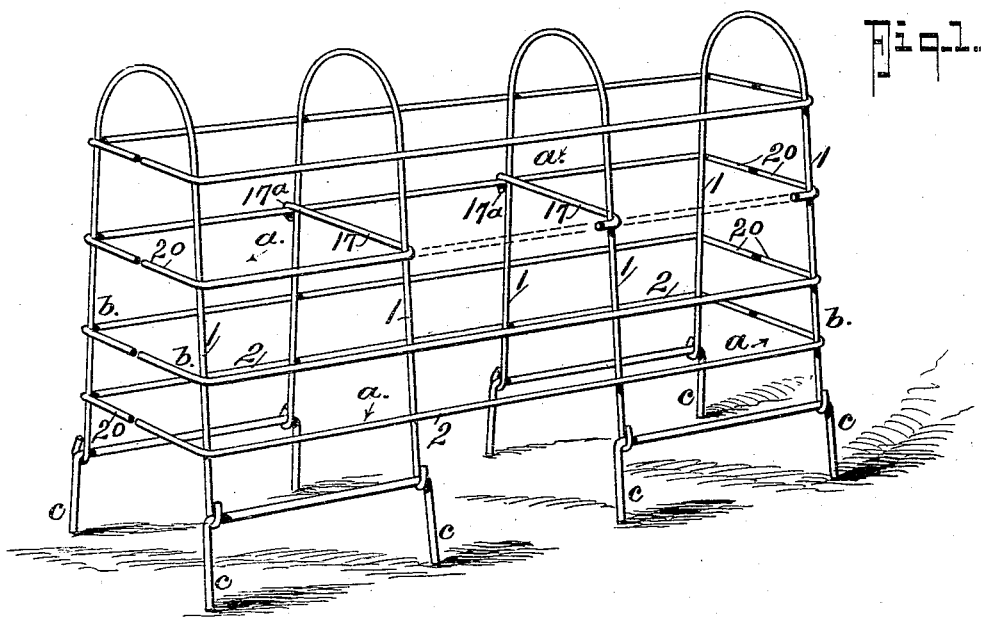
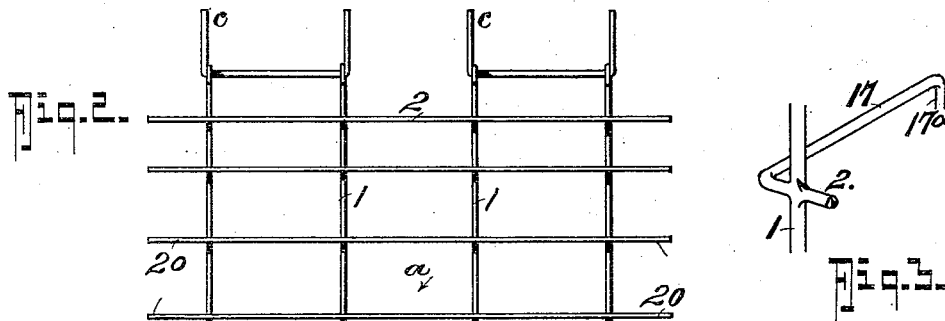
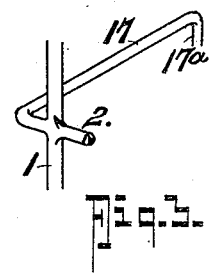
WITNESSES
INVENTOR
Charles A. Black Jr.
BY
Fred G. Dieterich & Co.
ATTORNEYS

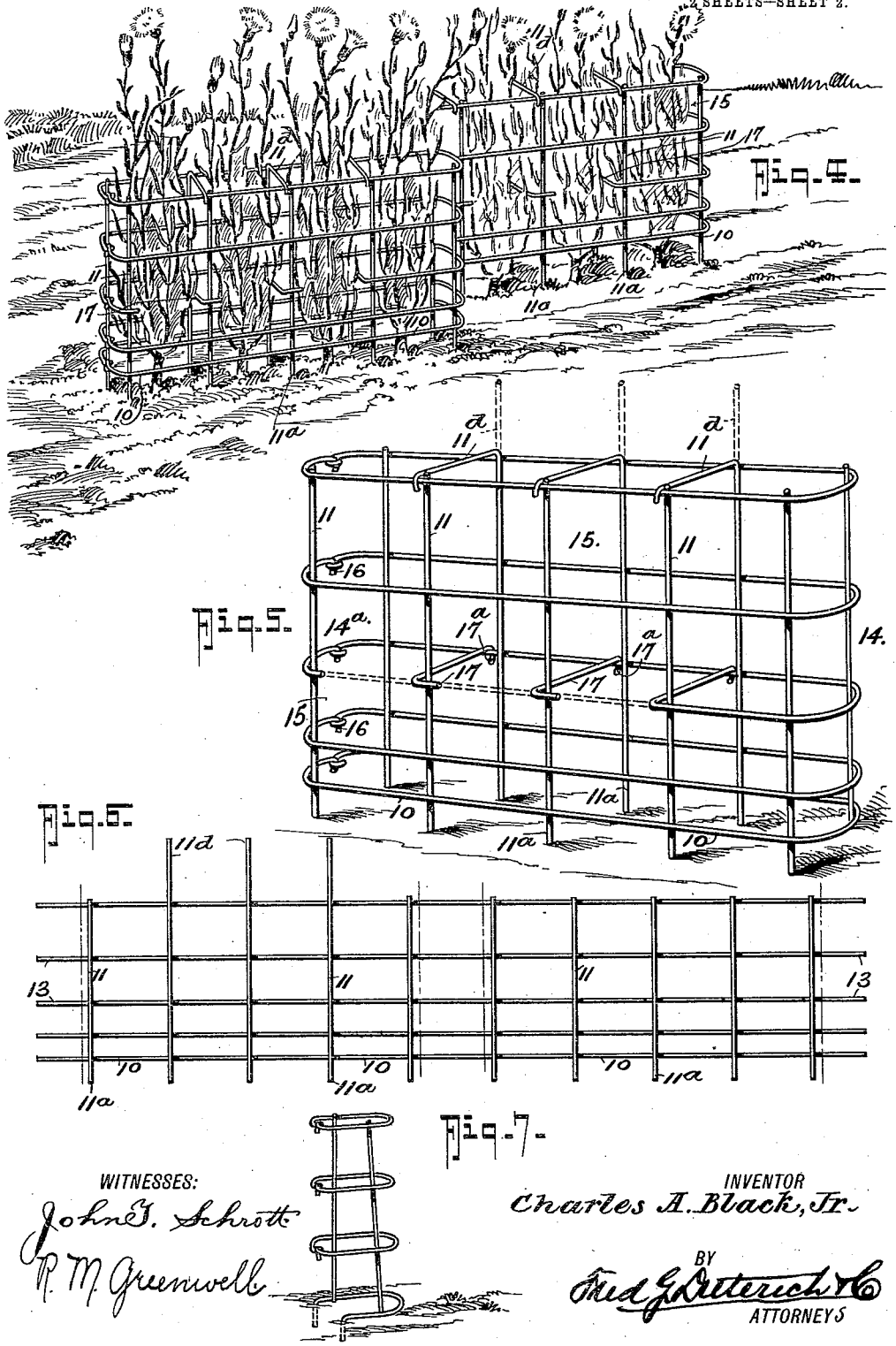

UNITED STATES PATENT OFFICE.

CHARLES A. BLACK, JR., OF HIGHTSTOWN, NEW JERSEY.

PLANT PROTECTOR AND SUPPORT.

1,018,157.          Specification of Letters Patent.      Patented Feb. 20, 1912.

Application filed October 17, 1911. Serial No. 655,162.

*To all whom it may concern:*

Be it known that I, CHARLES A. BLACK, Jr., residing at Hightstown, in the county of Mercer and State of New Jersey, have invented certain new and useful Improvements in Plant Protectors and Supports, of which the following is a specification.

This invention has reference to improvements in devices for supporting and protecting carnations and other choice flowers or plants, and it has for its object to provide a means of the general character stated that is especially designed for supporting large or small plants, is of a simple and economical construction, that can be readily made up in sizes to suit the different sizes of the flower-beds, and which is practically unbreakable and capable of being reused from year to year.

With other objects in view, that will hereinafter appear, my invention embodies a plant holder and protector consisting of the peculiar arrangement and combination of parts that are hereinafter described in detail, specifically pointed out in the appended claims, and illustrated in the accompanying drawings, in which:

Figure 1, is a perspective view of my plant protector and holder set up for use and illustrating the preferred construction. Fig. 2, is a plan view of a section of the wire body, cut and shaped to form, when bent up, the holder shown in Fig. 1. Fig. 3 is a detail view of a portion of the bent up body and illustrates one of the intermediate cross stays. Fig. 4, is a perspective view of my plant protector and holder set up for use and illustrating a modified construction. Fig. 5, is a similar view thereof, the same being shown on a larger scale than in Fig. 4. Fig. 6, is a plan view of a section of the poultry wire so cut and shaped that when bent up it will form a complete protector shown in Figs. 4 and 5. Fig. 7, is a detail perspective view showing how my invention may be embodied in a single plant support.

In making my holder, I take a section of poultry wire of somewhat greater length than the length of the flower bed to be protected and the said section has the ends of its crossed wires arranged as is best shown in Fig. 1, by reference to which it will be seen the vertical strands 1 have their opposite ends terminate at their respective upper and lower horizontal strands 2, while the said horizontal strands have their ends projected beyond their adjacent vertical strands 1—1 to form extensions 20—20, the purpose of which will presently appear, it being understood that the crossed wires or strands, at the point of crossing, are welded together or otherwise rigidly joined to form, as it were, a crossed wire body having a substantially rigid connection of the parts.

When the preferred form of my holder is made, the blank form shown in Fig. 2 is bent in the vertical plane thereof, that is, the upright wires 1 are bent over to form an arched shape framing having the shape shown in Fig. 1, and after the parts are thus bent the extensions 20—20 of the horizontal strands are brought together to form the opposite ends $b$—$b$ of the holder, the sides $a$—$a$ of which are formed by the bent over ends of the crossed wires, the arched portion forming the bracing for the top of the holder and also cross members that divide the holder, at the top, into separate spaces for receiving single plants.

When the parts are bent as shown and described, the opposite horizontal strands, see Fig. 2, become the bottom strands and these at intervals are cut and then bent down to form legs $c$—$c$ for entering the soil to secure the holder in the upright position. To further provide for bracing and supporting the holder some of the horizontal strands, at one side, are cut at suitable points whereby to provide members 17 for bending across the holder and hooking over the corresponding horizontal strands at the other side, the said members having their ends turned to form hooks 17$^a$, as is clearly shown in Fig. 1.

In Figs. 4, 5 and 6, of the drawings, I have illustrated a slightly modified form of my invention and in making such form, I take a section of woven poultry wire of approximately twice the length of the flower-bed to be protected and the said section is trimmed and cut to produce the blank form shown in Fig. 2 of the drawings, by reference to which it will be noticed that the strands are so cut as to leave the lower of the vertical members 11 projected uniformly some distance below the lowermost one of the horizontal strands 10, so as to form penetrating legs 11$^a$ that rest upon or are pushed down into the soil when the holder is set up for use, see Fig. 1. The several horizontal strands are cut so as to leave extensions 13 at each end, the reason for which will also presently be explained.

When the modified form of my holder is desired, the blank form shown in Fig. 5, cut to the required size, is bent in the horizontal plane, midway its length to form the end portion 14, and the two opposite sides 15, the free ends being bent inwardly toward each other and hooked as at 16 to form the end 14$^a$ opposite the end 14. After the blank is bent up, as stated, the extensions 11$^a$ of the several strands 11 are bent down and crosswise over the upper horizontal strands, the outer ends of the said extensions 11$^a$ being then bent down into a hook-shape, so as to embrace the opposite upper strands, the said members 11$^d$ now forming stay rods for bracing the top of the holder and cross members for dividing the holder into separate spaces or compartments for receiving the single plants. By reason of cutting up a section of the poultry wire into the blank forms shown in Figs. 2 and 5, the same can be readily made up into desired sizes and a large number of such sizes or that size and other sizes can be compactly held flatwise for shipping and storing, and further by reason of producing the blank form, as stated, the shipping of a protector and holder is very simple since all that is necessary is to bend the ends of the blank toward themselves, hook their free ends together, bend the extensions 11$^a$ and then cut the desired ones of the horizontal wires to form the cross combination stay and partition member 17 of the holder.

By reason of using the ordinary poultry wire, as stated, the holder can be very cheaply made and can be easily shipped, since the shipper need only know the size of the bed to be protected and further since the putting up of the holder can be readily and easily accomplished by any florist or florists' helper.

While I have described my invention as especially adapted for protecting carnations, it is obvious that the same may be used in connection with any other kind of upright growing flower. I may also adapt my invention for supporting plants singly and to accomplish this purpose I use a structure as is shown in Fig. 7, in which a narrow section of poultry wire is bent horizontally, the ends being hooked over and bent downwardly as hereinbefore described and shown.

What I claim is:

1. A plant protector consisting of a section of open wire work, bent upon itself and having its ends connected to form an inclosure, portions of the wire work forming soil penetrating members, and other portions being bent over transversely to form transverse stays.

2. A plant protector comprising a body consisting of sets of wire strands, one set of the said strands crossing the other set of said strands and rigidly secured at the crossing point, the said body being bent back upon itself to form an inclosure some of the said strands extending the full length of the said body, others of the said strands being cut and bent transversely to engage a strand on the opposite side thereto and form transverse braces.

3. A plant protector consisting of a set of vertically arranged horizontally spaced U-shaped strands, a set of longitudinal strands connecting the said U-shaped strands and rigidly secured thereto, the ends of the longitudinal strands being bent over at right angles to form end closures, some of the said second set of strands being bent over transversely to engage strands on the opposite side and thereby form transverse braces.

4. A plant protector consisting of a set of vertically arranged horizontally spaced U-shaped strands, a set of longitudinal strands connecting the said U-shaped strands and rigidly secured thereto, the ends of the longitudinal strands being bent over at right angles to form end closures, some of the said second set of strands being bent over transversely to engage strands on the opposite side and thereby form transverse braces, and soil penetrating members on which the said U-shaped strands are mounted.

5. As a new article, a form for a plant protector consisting of a section of poultry wire comprising a series of spaced vertically arranged wires, a series of parallel horizontally disposed wires rigidly secured to the vertical wires, the said horizontal wires having their opposite ends projected beyond the adjacent cross wires to which they are attached, some of the horizontal wires being cut and bent to form transverse braces and soil penetrating members.

CHAS. A. BLACK, JR.

Witnesses:
R. A. OUTCALT,
AUG. D. JURGENS,
ISAAC K. PULLEN.

---

Copies of this patent may be obtained for five cents each, by addressing the "Commissioner of Patents, Washington, D. C."